United States Patent [19]
Zucca

[11] 3,801,137
[45] Apr. 2, 1974

[54] AUTOMATIC RELEASING BACKING DEVICE FOR TRUCK DOLLY

[76] Inventor: Mark L. Zucca, 1608 Lafayette, Alameda, Calif. 94501

[22] Filed: July 7, 1972

[21] Appl. No.: 269,788

Related U.S. Application Data

[63] Continuation-in-part of Ser. No. 147,791, May 28, 1971.

[52] U.S. Cl................. 280/476, 280/418, 280/474, 280/477
[51] Int. Cl............................................ B62d 53/00
[58] Field of Search.... 280/408, 423 A, 445, 446 B, 280/474, 476, 477

[56] References Cited
UNITED STATES PATENTS

| | | | |
|---|---|---|---|
| 3,663,039 | 5/1972 | Morgan | 280/408 R |
| 3,612,575 | 10/1971 | Stewart | 280/408 R |
| 2,639,159 | 5/1953 | Milligan | 280/476 R |
| 2,458,666 | 1/1949 | Williams | 280/476 X |

Primary Examiner—Leo Friaglia
Assistant Examiner—Randall A. Schrecengost
Attorney, Agent, or Firm—Harris Zimmerman

[57] ABSTRACT

Apparatus attached to the rear portion of a truck adjacent the hook or coupling and/or to the dolly which is releasably attachable to the coupling. The apparatus operatively engages the tongue or draft bar of the dolly when the same has been attached to the coupling in a manner to prevent relative lateral movement between the truck and dolly during backing up of the same. When the dolly is connected to a semi trailer, the apparatus permits normal pivotal lateral movement between the truck and trailer for normal driving conditions.

In certain embodiments of the invention, the restraint against lateral movement is automatically released when the conventional fifth wheel of the dolly moves into its operative subjacent relationship with the semi trailer.

20 Claims, 18 Drawing Figures

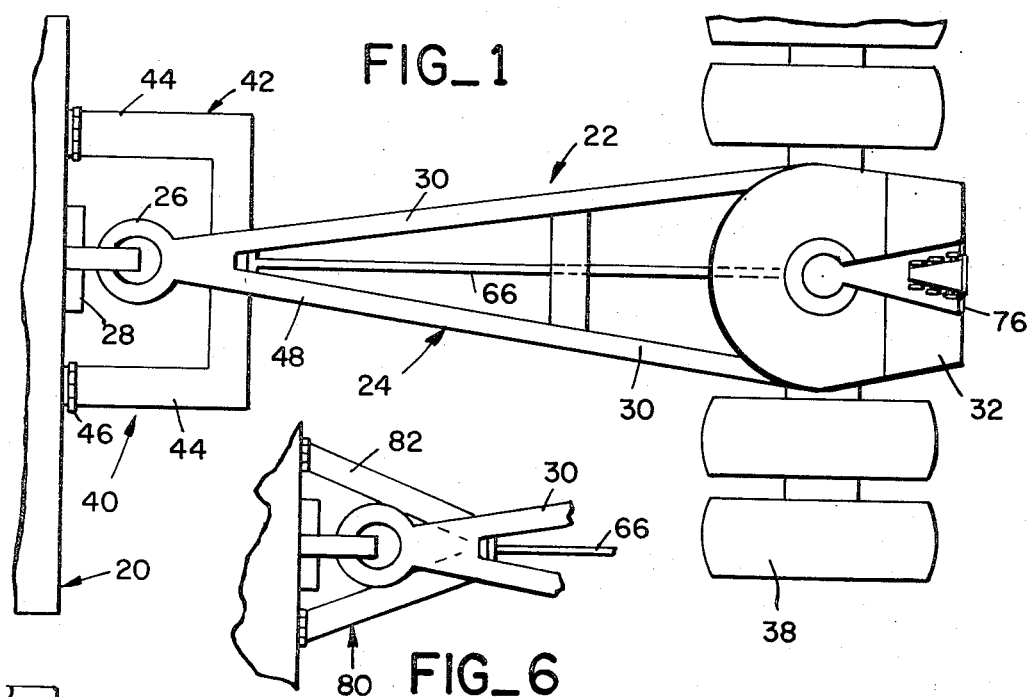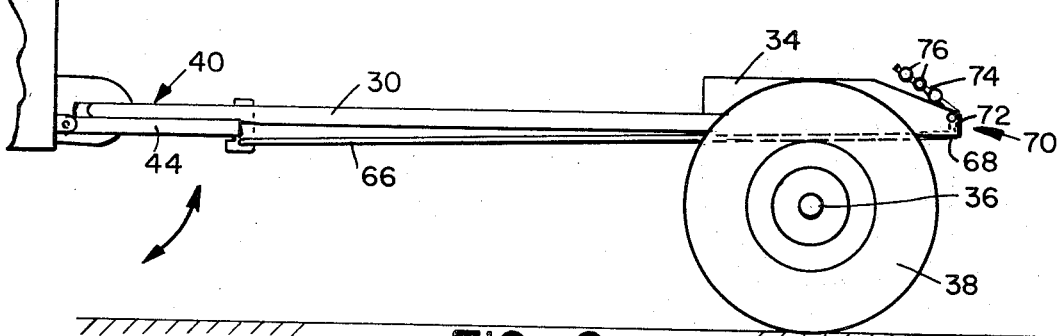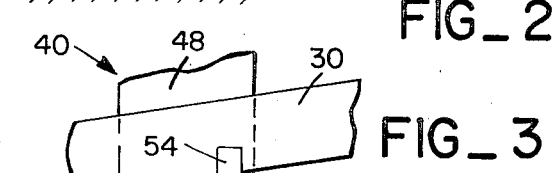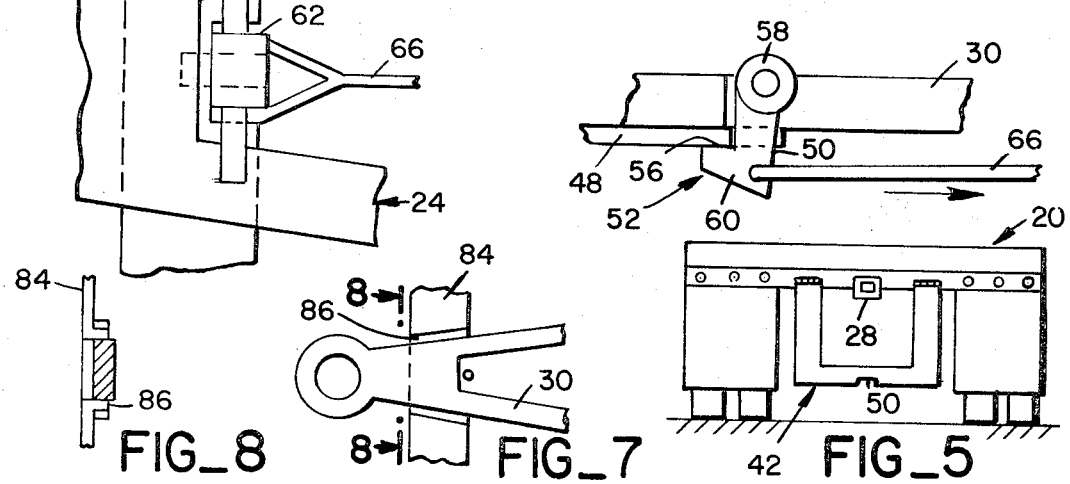

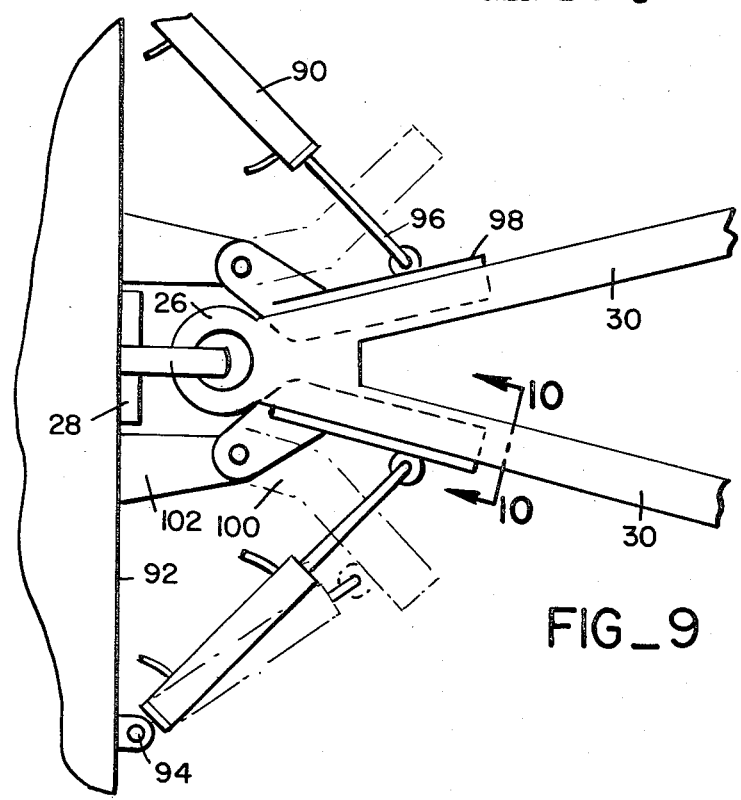
FIG_9
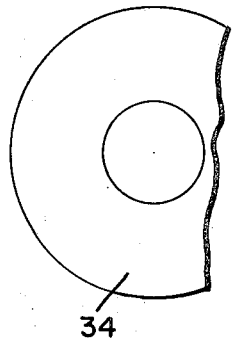
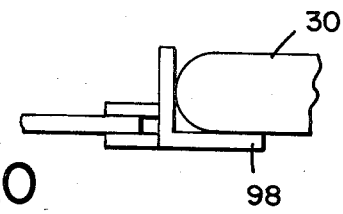
FIG_10
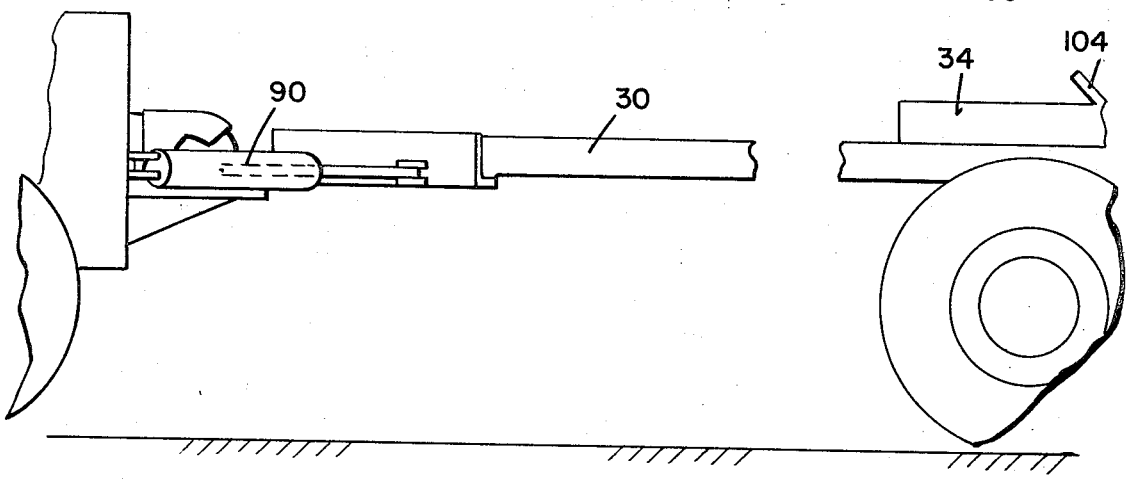
FIG_11
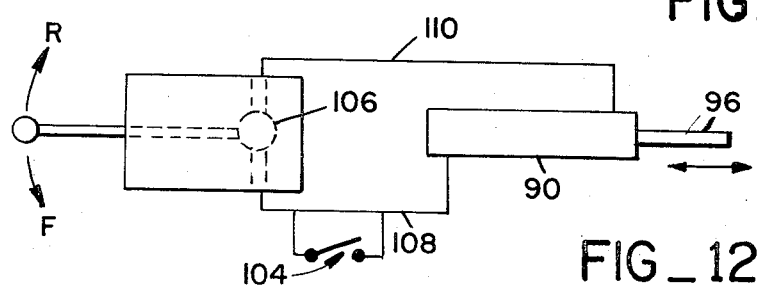
FIG_12

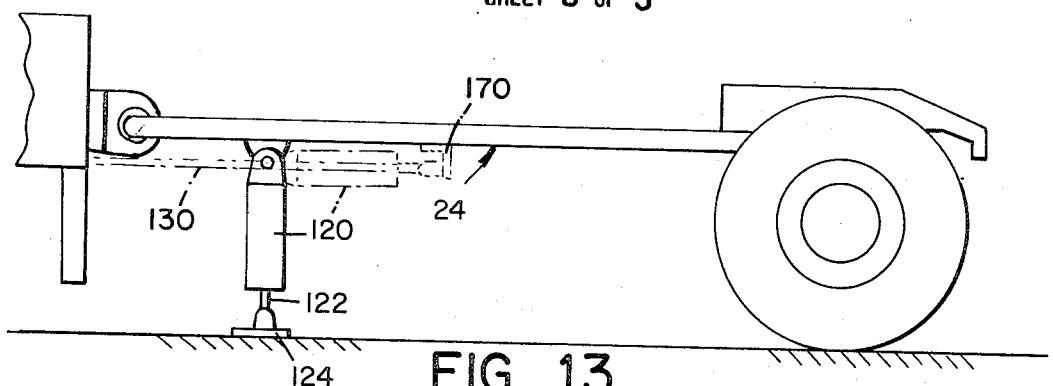
FIG_13
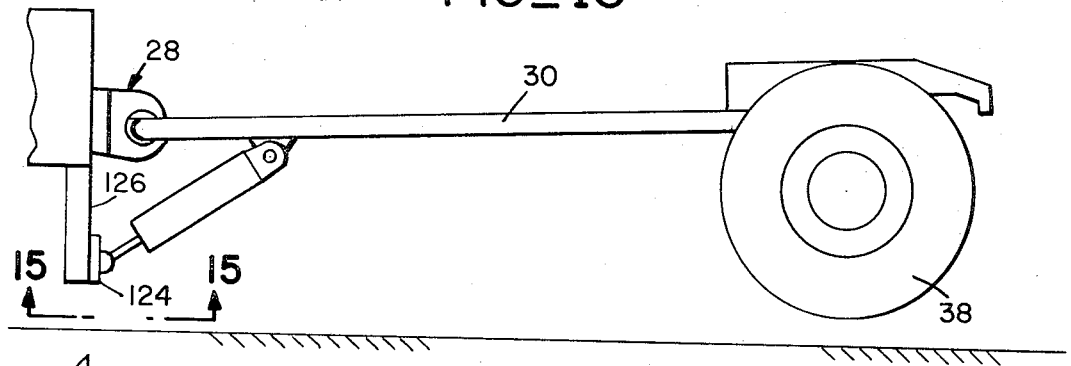
FIG_14
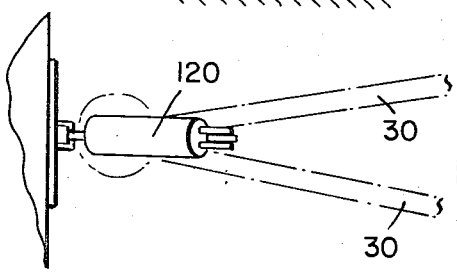
FIG_15
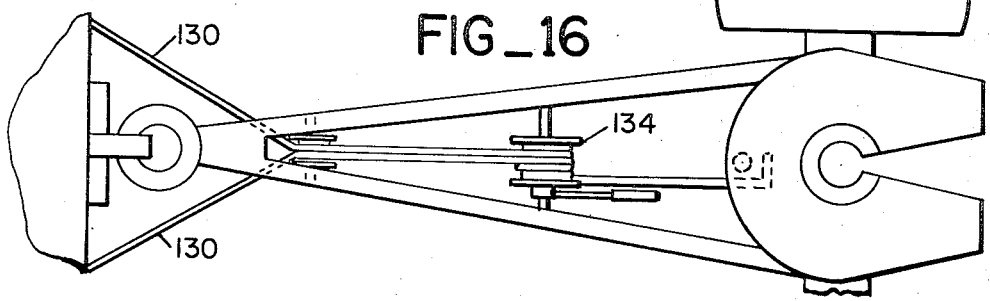
FIG_16
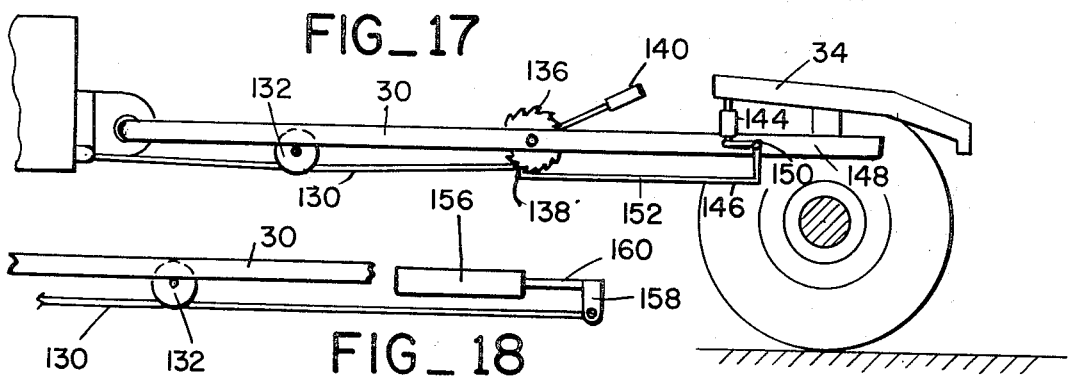
FIG_17
FIG_18

AUTOMATIC RELEASING BACKING DEVICE FOR TRUCK DOLLY

PRIOR APPLICATION

This application is a continuation in part of my prior application, Ser. No. 147,791 of May 28, 1971.

BACKGROUND OF THE INVENTION

Dollies, sometimes referred to in the trade as converters, are used in the trucking industry for releasably connecting a semi trailer to the rear end of a truck or another semi trailer which is provided with a trailer coupling. For purpose of explanation and identification only, the unit carrying the trailer coupling will be referred to in this application as a truck, although in many instances, such a unit would technically be considered a semi trailer. The dolly generally comprises an axle carrying a ground engaging wheel or wheels adjacent each end thereof and a tongue or draft bar having an eye or socket at the distal end thereof. In normal practice, the end of the tongue is raised to effect its engagement with the coupling. In backing up the truck with the dolly attached, it is desirable to prevent or limit lateral pivoting movement therebetween, but when engagement is effected between the dolly and the semi trailer to be hauled or pulled, lateral movement is required.

In addition to the improved locking or latching means for limiting lateral movement prior to engagement of the dolly with the semi trailer, it is a primary object of the present invention to provide automatic means for releasing the limiting or restraining means when and as the dolly is disposed adjacent the semi trailer for engagement therewith.

Preferably the means for limiting or restraining the lateral movement is incorporated in the truck adjacent the coupling mechanism while the release means is provided on the dolly itself and adapted to be triggered when the dolly is backed towards the semi trailer and engagement of the fifth wheel on the dolly is about to take place.

DRAWINGS

FIG. 1 is a top plan view of one embodiment of the present invention;

FIG. 2 is a side elevational view;

FIG. 3 is an enlarged plan view of a portion of the dolly latch mechanism;

FIG. 4 is an enlarged side elevational view of such latch mechanism;

FIG. 5 is a rear elevational view of the truck with the latch mechanism of FIGS. 1–4 in its lower inoperative position;

FIG. 6 is a portional plan view of a modified form of the FIG. 1 arrangement;

FIG. 7 is a portional plan view of another modified form of the invention;

FIG. 8 is a cross-sectional view taken in the plane 8—8 of FIG. 7;

FIG. 9 is a top plan view of another embodiment of the invention;

FIG. 10 is a cross-sectional view taken in the plane 10—10 of FIG. 9;

FIG. 11 is a side elevational view of the structure shown in FIG. 9;

FIG. 12 is a flow diagram or circuit for actuation of the cylinders shown in FIGS. 9 – 11;

FIG. 13 is a side elevational view of another embodiment;

FIG. 14 is a side elevational view similar to FIG. 13 illustrating the parts in a different position;

FIG. 15 is a view taken in lane 15—15 of FIG. 14;

FIG. 16 is a top plan view of a still further embodiment of my invention;

FIG. 17 is a side elevational view of the structure shown in FIG. 16; and

FIG. 18 is a side elevational view of a modified form of the device illustrated in FIGS. 16 and 17.

DESCRIPTION

As above stated, the apparatus of the present invention is in part intended to be installed on the rear portion of a truck 20 (as the term has been defined herein) and in part on a dolly or converter 22. In its operative position, the apparatus in the various embodiments about to be described will permit the truck and dolly to be backed up into adjacent relation to a semi trailer (not shown), with restraining or latching means preventing or limiting the dolly from pivotal or lateral movement relative to the truck. Then, when the dolly is backed into operative relationship with the semi trailer, the lateral restraining means are released in an automatic fashion. This overcomes a serious and substantial problem where the driver forgets to release such restraints and attempts normal driving with a tandem trailer rigidly connected to the truck. This can result in damage to the apparatus or an accident, or both.

The dolly 22 may be of any generally conventional design, and includes a yoke or tongue 24 having an eye 26 at one end thereof for releasable engagement with a coupling 28 disposed on the rear portion of the truck. The yoke as here illustrated is of bifurcated form having a pair of longitudinally extending elements 30 diverging outwardly from the eye 26 and terminating in a rear frame portion 32 on which the so-called fifth wheel 34 is mounted. Subjacent frame portion 32 is an axle 36 which carries ground engaging wheels 38 adjacent the ends thereof.

The construction above described is generally conventional, and as will be understood, the front end of the dolly which carries the eye 26 normally rests on the ground, and when a semi trailer is to be attached to the truck 20, the eye is raised, usually manually, and engaged with the coupling 28. Then, in order to properly back the dolly to position the fifth wheel subjacent the forward end of the semi trailer, it is desirable to restrict lateral motion between the truck 20 and the dolly 22.

Referring first to FIGS. 1 through 5 of the drawings, means 40 are provided on the truck adjacent coupling 28 for releasable engagement with frame elements 30. Means 40 includes a bracket 42 having spaced legs 44 which are pivotally secured at 46 to the rear end of truck 20 on opposite sides of the coupling 28. A cross bar 48 connects the outer ends of the legs, such bar having a notch 50 positioned medially of its ends. Bracket 42 will normally hang downwardly as shown in FIG. 5, but after the dolly eye has been engaged with the coupling 28, the bracket may be pivoted or swung upwardly into a generally horizontal position immediately subjacent the forward end portion of tongue 24.

It will be noted that the tongue is provided with a latch 52 pivotally carried on a shaft 54 extending between frame elements 30. The latch is disposed within the confines of notch 50 when the bracket is in its raised position and a shoulder 56 of the latch may underlie bar 48 to thereby maintain the bracket in its raised operative position. The latch 52 may, if desired, be provided with a torsion spring 58 which normally rocks the latch clockwise and into bracket latching relation, the bracket being slidable along a sloping lower surface 60 of the latch as the bracket is swung upwardly.

With particular reference to FIG. 3, it will be seen that the opposed sides 62 of the latch fit fairly close to the sides of bracket notch 50, and thus, the dolly will be restrained against lateral movement relative to the bracket, and similarly relative to the truck.

To permit a release of such restraining means when the semi trailer is engaged with the fifth wheel of the dolly, latch release means are provided which desirably operate in an automatic manner to avoid the possibility of driver error in forgetting to effect such release. There is thus provided a release rod 66 having its forward end pivotally connected to latch 52 below the pivot 54 thereof. Rearward movement of the rod (to the right as viewed in the drawings) will rock the latch in a counterclockwise direction, releasing engagement of shoulder 56 with bar 48, and permitting the bracket to fall downwardly to its inoperative position. The rear end of rod 66 is connected to one arm 68 of a bell crank 70 pivotally secured to the dolly frame at 72. The other arm 74 of the bell crank is provided with rollers 76 which are positioned to be engaged by the semi trailer just prior to the final positioning of the fifth wheel. As the rollers strike the semi trailer, the bell crank will rock counterclockwise and pull rod 66 rearwardly.

FIG. 6 discloses a slightly modified form of bracket in place of bracket 42. In this embodiment, the bracket, designated by the numeral 80, has arms 82 which converge rearwardly from their pivotal attachment to the truck, with the bracket notch disposed adjacent the juncture of the arms. The operation is the same as that previously described where the bracket 42 is of rectangular rather than triangular form.

FIGS. 7 and 8 disclose another embodiment of the invention. In this modification, any suitable latch mechanism or the like may be used to hold the pivoted bracket, such as 42 or 80 in its operative horizontal position. Here, a bar 84 is provided with opposed spaced side rails 86 between which dolly yoke elements 30 are seated and which are thus restrained against lateral motion relative to the bracket.

In FIGS. 9 – 12, a further modification is disclosed wherein the means for restraining lateral dolly movement includes hydraulic or pneumatic cylinders 90 mounted on the rear wall portion 92 of the truck on opposite sides of coupling 28. More particularly, the base of each cylinder is pivotally secured to the truck as indicated at 94, with the distal end of each piston rod 96 pivotally connected to an angle bracket 98. The bracket has an angularly offset portion 100 which is pivotally connected to a base member 102 extending outwardly from the truck. After the yoke of the dolly is coupled to the truck, the cylinders are actuated so as to extend the piston rods, rocking the brackets 98 inwardly and against frame elements 30 to restrain the same against lateral motion.

After connection of the semi trailer, the cylinders are actuated to effect a retraction of the piston rods and a consequent release of the brackets from the yoke of the dolly. It might be pointed out that automatic release can be effected in a number of different ways. For example, a switch 104 disposed on the rear portion of the dolly frame can be tripped as the dolly is being backed up into its trailer engaging position. Such a switch may be used independently of or in conjunction with a cab controlled circuit shown in FIG. 12. With this latter arrangement, when the operator has the gear shaft lever in reverse, and manually closes a switch 104 which can be mounted in the cab, a valve 106 will direct fluid into the cylinder through line 108 to extend the rod 96 and lock the dolly. Then, if the operator moves the lever to forward, the valve 106 will direct fluid through line 110 to retract the piston rod and release the dolly. This type of circuitry can be used in locking arrangements other than that shown in FIGS. 9 to 12.

In FIGS. 13 to 15, an arrangement is disclosed which performs an additional function to that of merely restraining the aforesaid lateral movement between the truck and attached dolly. Here, a single cylinder 120 is pivotally attached to dolly yoke 24, although a pair of spaced cylinders could likewise be used. A piston rod 122 carries a bearing plate 124 at its end. The cylinder may depend vertically from the yoke as shown in FIG. 13, with plate 124 resting on the ground in order to raise the front end of the dolly into coupling position. After the yoke eye is engaged with the coupling 28, the rod 122 may be retracted, and the cylinder swung into the position shown in FIG. 14 with plate 124 bearing against the rear portion 126 of the truck. By then extending rod 122, the dolly will be rocked about its coupling 28, raising wheels 38 above the ground, and thus obviously not interfering with a backing up operation, although the cylinder will maintain the yoke in an aligned condition with the truck. The forms of automatic release above discussed may be used to retract the cylinder piston rods.

The modification shown in FIGS. 16 and 17 utilizes cables 130 to restrain the dolly. One end of each cable is attached to the truck and then passes under a sheave 132 carried by the yoke of the dolly. A winch 134 is also carried on the dolly and has associated with it a spring loaded ratchet wheel 136, a pawl 138, and a handle 140 for applying tension to the cables. When the cables are tightened, the dolly will be laterally restrained. To provide for automatic release, the normally pivoted mounted fifth wheel 34, upon movement under the semi trailer will force a spring loaded plunger 144 downwardly. The plunger acts on one arm 146 of a bell crank pivotally carried at 148 to the dolly and whose other arm 150 is connected to pawl 138 through a rod 152. Rocking of the fifth wheel will move rod 152 to the rear (to the right as shown in the drawing) thus releasing the cables. Where the term "cable" is used in the foregoing description or in the claims, it is intended to refer to any form of flexible element such as a chain, wire rope, or the like.

In place of the winch 134 and associated mechanism as shown in FIGS. 16 and 17, a pneumatic or hydraulic cylinder 156 can be used as illustrated in FIG. 18 for applying tension force to cables 130. More particularly, a bracket 158 connected to the distal end of piston rod 160 is secured to cable 130. Any of the release means previously discussed can be operatively connected to the cylinder to effect a retraction of the rod and consequent slackening of the cables.

With the cables 130 as illustrated in FIGS. 16 and 17, the cylinder 120 can be used as shown in phantom lines in FIG. 13, with cables 130 likewise shown in phantom. Here the cables may be connected to any suitable bracket, slidably carried on the tongue. When cylinder 120 is swung upwardly in a counterclockwise direction, the rod 122 or plate 124 will engage the bracket and upon extension of the rod, cause a tensioning of the cables and a locking of the dolly.

I claim:

1. Apparatus of the character described for use with a truck and a dolly connected thereto in which said dolly has a longitudinally extending tongue with its forward end releasably connected to a coupling element on said truck and its rearward end provided with ground engaging wheels and a fifth wheel mechanism for connection with a semi trailer; said apparatus including locking means operatively associated with said truck and said tongue and movable from a first operative position limiting relative lateral movement between said truck and said dolly to a second inoperative position permitting relative lateral movement between said truck and said dolly, and release means operatively connected to said locking means for effecting automatic release of the locking means, said release means including trip means operatively engageable by a semi trailer when said dolly is moved into connecting relationship therewith for moving said locking means to said inoperative position.

2. Apparatus as set forth in claim 1 in which said trip means is mounted on said dolly adjacent said fifth wheel mechanism.

3. Apparatus as set forth in claim 1 in which said trip means is pivotally mounted on said dolly and includes rollers carried thereby.

4. Apparatus as set forth in claim 1 in which said release means includes a member extending longitudinally of said dolly and operatively connected to said trip means at one end thereof and to said locking means at the other end thereof.

5. Apparatus as set forth in claim 1 in which said fifth wheel mechanism is pivotally mounted on said dolly, said release means being disposed subjacent said fifth wheel mechanism and actuated upon rocking movement of said mechanism as the latter is moved into connecting relationship with a semi trailer.

6. Apparatus as set forth in claim 5 in which said release means includes a spring loaded arm.

7. Apparatus as set forth in claim 1 in which said release means comprises a switch.

8. Apparatus as set forth in claim 1 in which said locking means includes a member pivotally mounted on said truck adjacent said coupling element and engageable with said dolly.

9. Apparatus as set forth in claim 8 in which said member has an extensible portion.

10. Apparatus as set forth in claim 8 in which said member includes a fluid cylinder having a rod extending therefrom operatively engageable with said dolly.

11. Apparatus as set forth in claim 8 in which said member is provided with a notched portion, and a latch device carried on said tongue within said portion when said member is in said operative position.

12. Apparatus as set forth in claim 8 in which said member is provided with spaced side rails for engaging opposite side portions of said tongue when said member is in said operative position.

13. Apparatus as set forth in claim 1 in which said locking means includes a pair of cylinders each pivotally carried on said truck and having a piston rod extending therefrom, a bracket carried on the end of each rod and engageable with a side portion of said tongue.

14. Apparatus as set forth in claim 13 in which said bracket is of angle cross sectional configuration, and means mounting said bracket for pivotal movement on said piston rod.

15. Apparatus as set forth in claim 13 including switch means for selectively operating said cylinders.

16. Apparatus as set forth in claim 15 in which said switch means is carried on said tongue adjacent said fifth wheel.

17. Apparatus as set forth in claim 1 in which said locking means includes cables extending between said truck and said dolly and means selectively applying tension to said cables.

18. Apparatus as set forth in claim 17 in which said last named means includes a cylinder mounted on said dolly and having an extensible portion operatively connected to said cables.

19. Apparatus as set forth in claim 1 in which said locking means includes a cylinder having an extensible piston rod, a fluid valve which in a reverse position of the truck gear shift causes said rod to move in a direction for limiting said lateral movement and which in a forward position of such gear shift moves said rod in a contra direction.

20. Apparatus as set forth in claim 19 including switch means interposed between said cylinder and said valve.

* * * * *